(12) United States Patent
Hauser (10) Patent No.: US 8,919,717 B2
(45) Date of Patent: Dec. 30, 2014

(54) FASTENING DEVICE AND ATTACHMENT PART HAVING A FASTENING DEVICE

(75) Inventor: Ingo Hauser, Kandern (DE)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 13/508,592

(22) PCT Filed: Nov. 16, 2010

(86) PCT No.: PCT/EP2010/067568
§ 371 (c)(1),
(2), (4) Date: May 8, 2012

(87) PCT Pub. No.: WO2011/067107
PCT Pub. Date: Jun. 9, 2011

(65) Prior Publication Data
US 2012/0228458 A1    Sep. 13, 2012

(30) Foreign Application Priority Data

Dec. 3, 2009    (DE) .......................... 10 2009 056 907

(51) Int. Cl.
*A47F 5/00*    (2006.01)
*F16B 37/08*    (2006.01)
*F16B 5/06*    (2006.01)

(52) U.S. Cl.
CPC ............ *F16B 37/0842* (2013.01); *F16B 5/0685* (2013.01)
USPC ....... 248/309.1; 248/74.4; 248/68.1; 248/635

(58) Field of Classification Search
USPC ............. 248/309.1, 315, 359 R, 60, 68.1, 59, 248/74.1, 74.4, 74.2, 65, 73, 55, 634, 635, 248/909, 49, 72, 69, 67.5, 316.1; 174/146, 174/168, 148, 169, 138 E; 411/431, 999, 411/377, 396, 970; 24/16 R
See application file for complete search history.

(56) References Cited

U.S. PATENT DOCUMENTS

| | | | | |
|---|---|---|---|---|
| 1,649,355 A | * | 11/1927 | Lindsay et al. | 248/68.1 |
| 3,894,706 A | * | 7/1975 | Mizusawa | 248/68.1 |
| 4,840,333 A | * | 6/1989 | Nakayama | 248/68.1 |
| 4,899,964 A | * | 2/1990 | Sick | 248/68.1 |
| 4,934,889 A | * | 6/1990 | Kurosaki | 411/433 |
| 5,033,701 A | * | 7/1991 | Kraus | 248/68.1 |
| H001012 H | * | 1/1992 | Senatro | 248/68.1 |
| 5,271,587 A | * | 12/1993 | Schaty et al. | 248/68.1 |
| 5,271,588 A | * | 12/1993 | Doyle | 248/68.1 |
| 5,660,513 A | * | 8/1997 | Shibanushi | 411/433 |

(Continued)

FOREIGN PATENT DOCUMENTS

| | | |
|---|---|---|
| DE | 102005032535 A1 | 1/2007 |
| EP | 1621782 A1 | 2/2006 |
| WO | WO2009/014817 A2 | 1/2009 |

OTHER PUBLICATIONS

International Search Report and Written Opinion mailed Mar. 4, 2011 in related International Application No. PCT/EP2010/067568.

*Primary Examiner* — Monica Millner
(74) *Attorney, Agent, or Firm* — Faegre Baker Daniels LLP (57) ABSTRACT

A fastening device having equalization elements, which are movable in the longitudinal direction of a receiving sleeve for adjustment to different diameters of oblong fastening elements such as coarse thread bolts, which hold the fastening element substantially without play in the receiving sleeve in dependence on the diameter of the respective fastening element.

10 Claims, 9 Drawing Sheets

(56) References Cited

U.S. PATENT DOCUMENTS

| | | | |
|---|---|---|---|
| 5,769,556 A * | 6/1998 | Colley | 403/24 |
| 5,794,897 A * | 8/1998 | Jobin et al. | 248/74.4 |
| 5,941,483 A * | 8/1999 | Baginski | 248/68.1 |
| 6,070,836 A * | 6/2000 | Battie et al. | 248/68.1 |
| 6,089,513 A * | 7/2000 | Cau et al. | 248/68.1 |
| 6,152,406 A * | 11/2000 | Denndou | 248/68.1 |
| 6,196,751 B1 * | 3/2001 | Khokhar | 403/3 |
| 6,206,330 B1 * | 3/2001 | Oi et al. | 248/68.1 |
| 6,371,707 B1 * | 4/2002 | Schaty | 411/339 |
| 6,419,192 B1 * | 7/2002 | Riecke | 248/65 |
| 6,708,931 B2 * | 3/2004 | Miura | 248/68.1 |
| 7,066,701 B2 * | 6/2006 | Kovac | 411/433 |
| 7,162,790 B1 * | 1/2007 | Daniels | 29/525.01 |
| 7,172,162 B2 * | 2/2007 | Mizukoshi et al. | 248/68.1 |
| 7,182,563 B2 * | 2/2007 | Wimmer et al. | 411/174 |
| 7,316,374 B2 * | 1/2008 | Maruyama | 248/68.1 |
| 7,322,784 B2 | 1/2008 | Castro | |
| 7,401,753 B2 * | 7/2008 | Bozmoski et al. | 248/68.1 |
| 7,464,966 B2 * | 12/2008 | Miyajima et al. | 285/124.3 |
| 7,546,986 B2 * | 6/2009 | Kim | 248/62 |
| 7,789,352 B2 * | 9/2010 | Darling, III | 248/74.4 |
| 7,891,151 B2 * | 2/2011 | Sano | 52/506.05 |
| 8,093,501 B2 * | 1/2012 | Stansberry, Jr. | 174/146 |
| 8,328,458 B2 * | 12/2012 | Werth | 403/289 |
| 8,328,488 B2 * | 12/2012 | Luk | 411/433 |
| 8,353,125 B2 * | 1/2013 | Riley | 42/90 |
| 2003/0025048 A1 * | 2/2003 | Knotts | 248/68.1 |
| 2004/0056156 A1 * | 3/2004 | Dodson | 248/59 |
| 2004/0084951 A1 * | 5/2004 | Pawlush | 297/452.63 |
| 2005/0242245 A1 * | 11/2005 | Balderama et al. | 248/65 |
| 2007/0215757 A1 * | 9/2007 | Yuta | 248/68.1 |
| 2007/0246614 A1 * | 10/2007 | Allmann et al. | 248/65 |
| 2009/0256032 A1 | 10/2009 | Takenaka et al. | |

* cited by examiner

FASTENING DEVICE AND ATTACHMENT PART HAVING A FASTENING DEVICE

CROSS-REFERENCE TO RELATED APPLICATION

This application is a U.S. National Phase Patent Application based on International Application No. PCT/EP2010/067568 filed Nov. 16, 2010, the entire disclosure of which is hereby explicitly incorporated by reference herein.

BACKGROUND OF THE INVENTION

1. Field of the Invention

The present invention is directed to a fastening device and an attachment part equipped with such a fastening device.

2. Description of the Related Art

One fastening device with an attachment part is known from DE 10 2005 032 535 A1. The previous known fastening device for fastening an attachment part connected to the fastening device to a support part having at least one elongated fastening element comprises a receiving sleeve extending in a longitudinal direction and adapted to surround the fastening element. Also present is a rear engaging unit, on which are formed a number of rear engaging tongues for engaging behind a detent structure of the fastening element. The rear engaging tongues are configured as flexible, so fastening elements with different radial dimensions can be used with the prior fastening device. A problem, however, is that the engagement of relatively small-diameter fastening elements with the prior fastening device necessarily suffers from play.

SUMMARY OF THE INVENTION

The present invention provides a fastening device and an attachment part, by means of which elongated fastening elements of different diameters come into engagement with the fastening device substantially without play.

Owing to the presence of at least one equalizing element that is displaceable in the longitudinal direction in the receiving sleeve, the useful cross section of the fastening device can be adjusted to different cross sections of elongated fastening elements by virtue of the position of the or each equalizing element.

In one form thereof, the present invention provides a fastening device for fastening an attachment part connected to the fastening device to a support part comprising at least one elongated fastening element, with a receiving sleeve extending in a longitudinal direction and adapted to surround the fastening element, and with a number of rear engaging tongues configured to engage behind a detent structure of the fastening element, characterized in that at least one equalizing element is present that is mounted displaceably in a longitudinal direction in the receiving sleeve, and in that in an equalizing position of retraction into the receiving sleeve, the useful cross section of the fastening device is decreased in comparison to an extended offset position.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Figure 1:
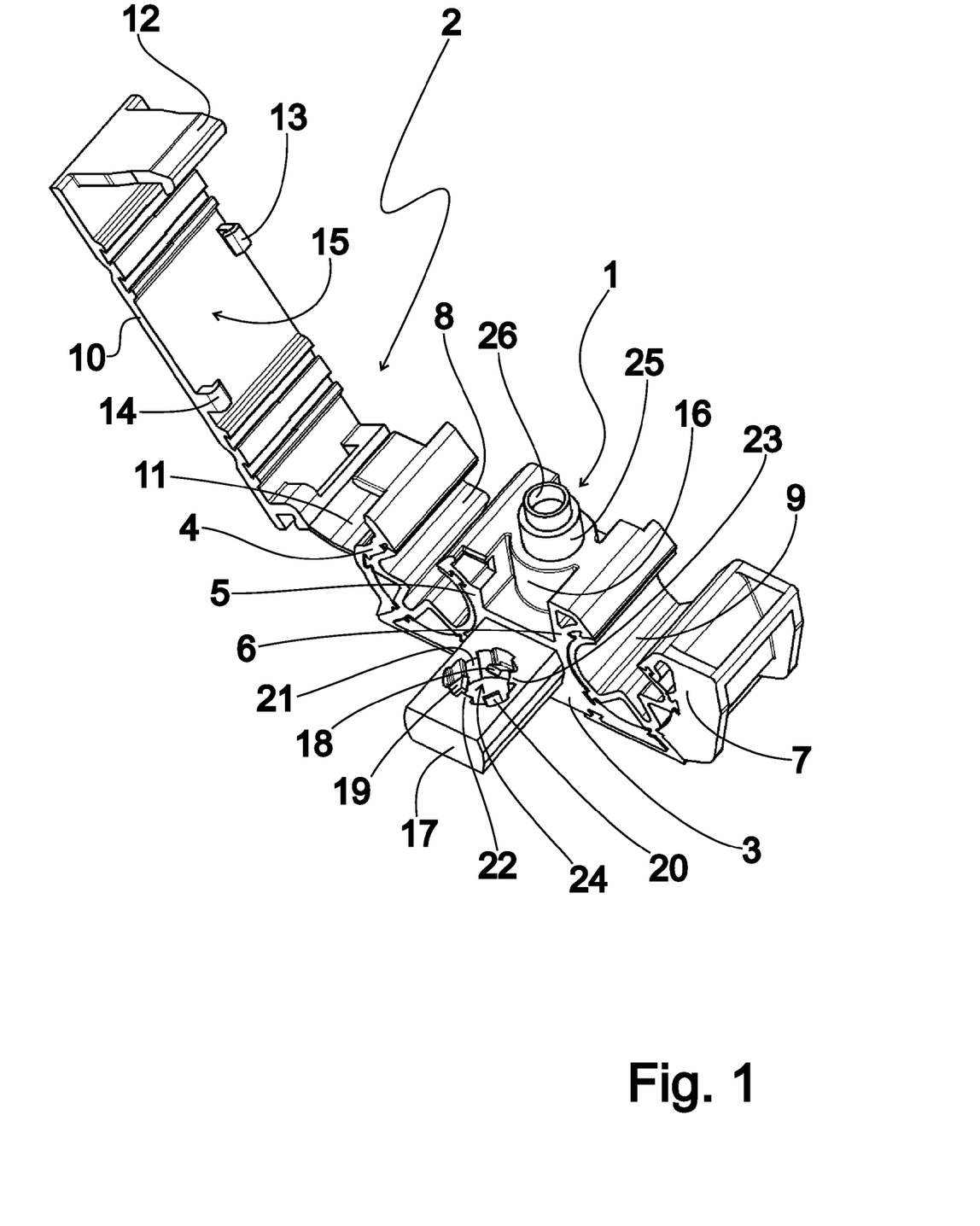
FIG. 1 is a perspective view of an exemplary embodiment of a fastening device according to the invention having two equalizing sleeves as equalizing elements, which embodiment is made entirely of plastic.

FIG. 1 is a perspective view of an exemplary embodiment of a fastening device 1 that has been produced entirely from plastic in a single injection molding operation and is integrated in one piece into a line holder 2 as an attachment part that is to be attached to a support part (not shown in FIG. 1). The line holder 2 comprises a base part 3 and, formed on said base part 3, a first pair of side cheeks 4, 5 and a second pair of side cheeks 6, 7, between each pair of which is disposed a respective C-shaped support mat 8, 9 made of a soft elastic plastic and provided to hold a respective line arrangement. In the exemplary embodiment of FIG. 1, the fastening device 1 is positioned between the pairs of side cheeks 4, 5, 6, 7.

The line holder 2 is also provided with a cover part 10, which is pivotably mounted on the base part 3 via a hinge portion 11 and can be interlocked with the base part 3 via a number of detent hooks 12, 13, 14. The cover part 10 is configured with a flat covering region 15, which, when resting atop the base part 3, covers the fastening device 1.

The fastening device 1 according to the exemplary embodiment of FIG. 1 is provided with a receiving sleeve 16 configured as hollow-cylindrical and with a rear engaging unit 17, which in the arrangement according to FIG. 1 is depicted in a position in which it is extended out of the base part 3, as it would be on removal from the injection mold. The rear engaging unit 17 is configured with a number of—for example, three—rear engaging tongues 18, 19, 20 and, between said rear engaging tongues 18, 19, 20, stop pedestals 21, 22, 23 disposed in a through opening 24 formed in the rear engaging unit 17.

The rear engaging tongues 18, 19, 20 are adjustable in a direction toward the receiving sleeve 16 and are evenly spaced apart peripherally. The stop pedestals 21, 22, 23 project radially into the through opening.

In the exemplary embodiment according to FIG. 1, the fastening device 1 also comprises an outer equalizing sleeve 25 and an inner equalizing sleeve 26, which are configured as hollow-cylindrical and are concentrically mounted displaceably in receiving sleeve 16, the inner equalizing sleeve 26 being inside the outer equalizing sleeve 25. In the representation of FIG. 1, receiving sleeve 16 and equalizing sleeves 25, 26 are depicted with their respective ends mutually adjacent, which would be the arrangement on removal from the injection mold.

When cover part 10 is closed, the covering region 15 is disposed on the side of receiving sleeve 16 facing away from rear engaging unit 17 and prevents the equalizing sleeves 25, 26 from coming out of the receiving sleeve 16.

Figure 2:
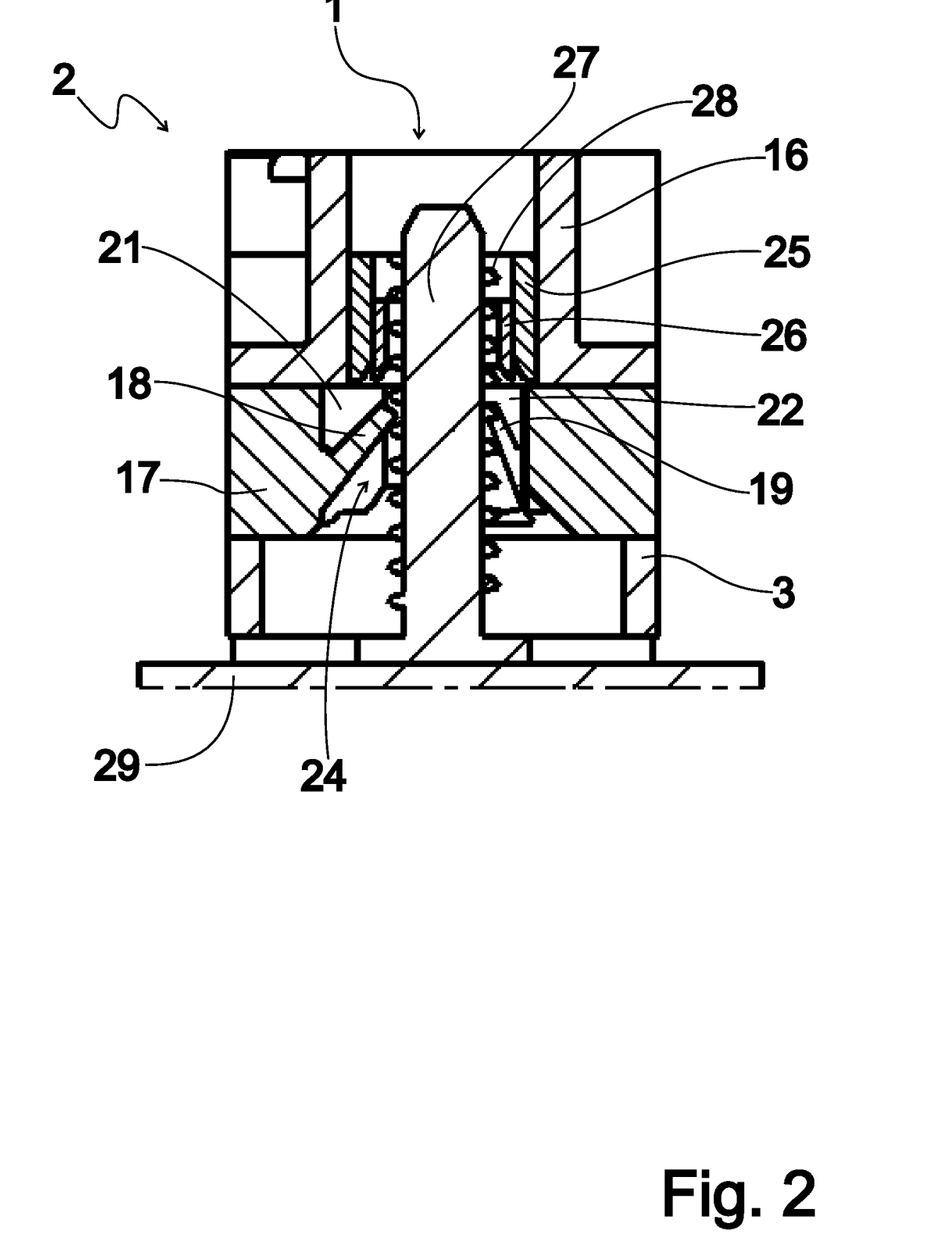
FIG. 2 is a sectional view of the exemplary embodiment according to FIG. 1 in engagement with a relatively small-diameter coarse thread bolt as fastening element.

FIG. 2 is a sectional view of the exemplary embodiment of a fastening device 1 according to the invention as depicted in FIG. 1, in engagement with a relatively small-diameter coarse thread bolt 27, as elongated fastening element, which is configured with a thread structure 28 as detent structure and is fastened to a support part 29. It can be seen from FIG. 2 that when a relatively small-diameter coarse thread bolt 27 is used, inner equalizing sleeve 26 and outer equalizing sleeve 25, after being pushed together from the injection arrangement shown in FIG. 1, are disposed concentrically inside receiving sleeve 16 and rest on stop pedestals 21, 22, 23, which serve as a deep stop.

When a relatively small-diameter coarse thread bolt 27 is used, the rear engaging tongues 18, 19, 20 are substantially completely relaxed and engage the coarse thread structure 28 from behind substantially without bias. In this arrangement, inner equalizing sleeve 26 contactingly surrounds the coarse thread structure 28 of the coarse thread bolt 27, while the rear engaging tongues 18, 29, 20 engage the thread structure 28 of the coarse thread bolt 27 from behind. Thus, in this refracted equalizing position of the two equalizing sleeves 25, 26, using a minimal useful cross section, the line holder 2 is fastened to the support part 29 substantially without play.

Figure 3:
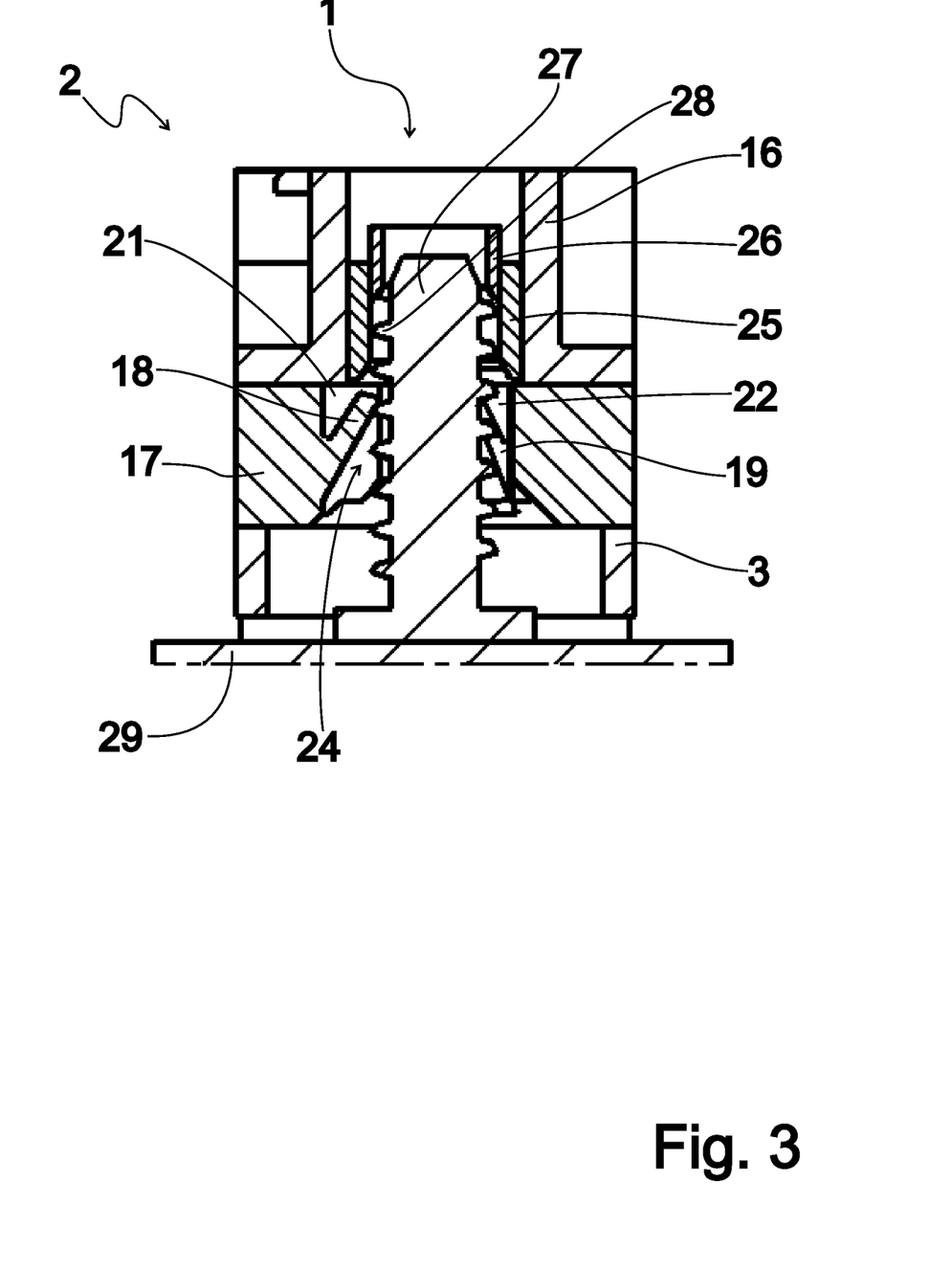
FIG. 3 is a sectional view of the exemplary embodiment according to FIG. 1 in engagement with a medium-diameter coarse thread bolt as fastening element.

FIG. 3 is a sectional view of the exemplary embodiment of a fastening device 1 according to the invention as depicted in FIG. 1 with a medium-diameter coarse thread bolt 27 as elongated fastening element, in an arrangement wherein it is mated onto said coarse thread bolt 27. The coarse thread bolt 27 according to FIG. 2 is configured with a thread structure 28 as detent structure. Due to the larger diameter of the medium-diameter coarse thread bolt 27 of FIG. 3 compared to the relatively small-diameter coarse thread bolt 27 of FIG. 2, the inner equalizing sleeve 26 is shifted, compared to the arrangement of FIG. 2, in the axial direction away from rear engaging unit 17 into an extended offset position, with the result that with this medium-sized useful cross section of the fastening device 1, outer equalizing sleeve 25 substantially tightly surrounds the thread structure 28 of the medium-diameter coarse thread bolt 27.

Due to the larger diameter of the coarse thread bolt 27 compared to the arrangement of FIG. 2, the rear engaging tongues 18, 19, 20 now engage the thread structure 28 with a certain bias, since they are bowed radially outward. Thus, substantially play-free rear engagement of the coarse thread bolt 27 is also ensured in the arrangement of FIG. 3, with inner equalizing sleeve 26 in an offset position and outer equalizing sleeve 25 in a retracted equalizing position.

Figure 4:
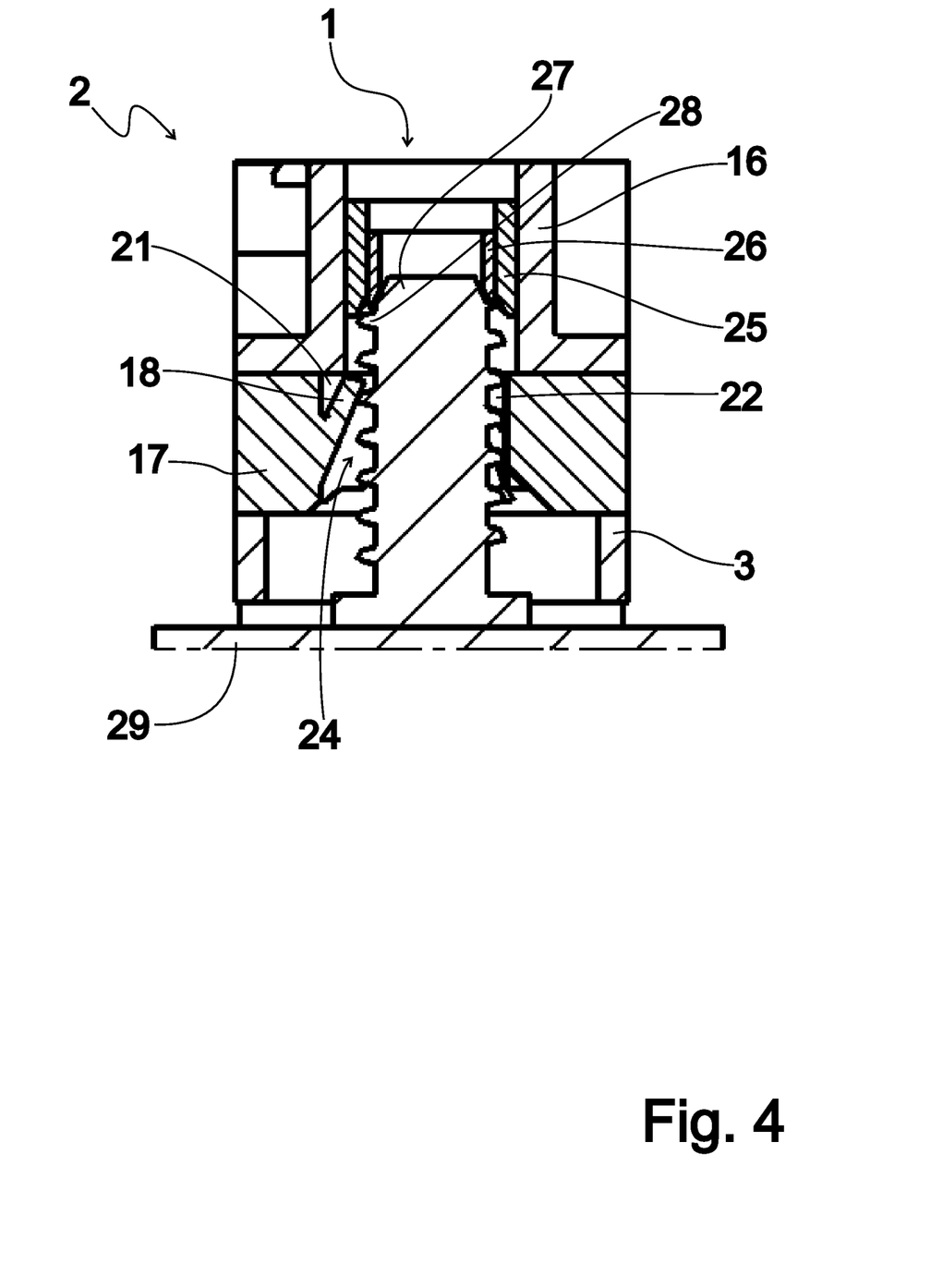
FIG. 4 is a sectional view of the exemplary embodiment according to FIG. 1 in engagement with a relatively large-diameter coarse thread bolt as fastening element.

FIG. 4 is a sectional view of the exemplary embodiment according to FIG. 1 in engagement with a relatively large-diameter coarse thread bolt 27 as elongated fastening element, configured with a thread structure 28 as detent structure. Due to the still greater diameter of the coarse thread bolt 27 compared to the arrangement of FIG. 3, using this maximal useful cross section of the fastening device 1, outer equalizing sleeve 25 is also spaced apart from the rear engaging unit 17 in the axial direction, such that, in the arrangement of FIG. 4, the receiving sleeve 16 now surrounds the coarse thread bolt 27 with a relatively small space between them, whereas the equalizing sleeves 25, 26 rest fixingly and substantially without play on the end of coarse thread bolt 27 remote from support part 29.

The rear engaging tongues 18, 19, 20 are again bowed farther radially outward compared to the position of FIG. 3, causing them to engage the thread structure 28 of the relatively large-diameter coarse thread bolt 27 from behind with a still greater bias compared to the arrangement of FIG. 3, and hold it in the fastening device 1, along with the equalizing sleeves 25, 26 and the receiving sleeve 16, substantially without play.

Figure 5:
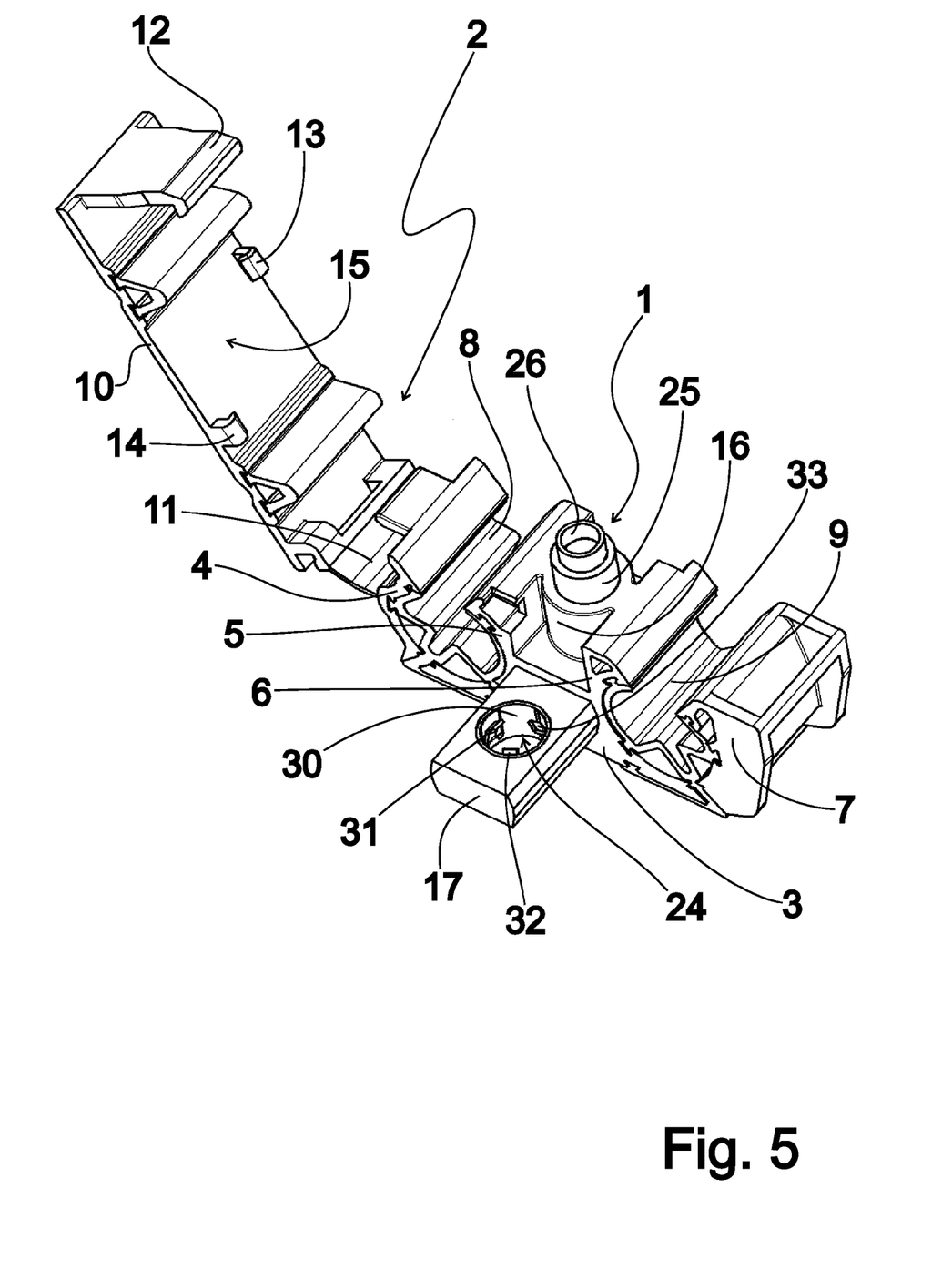
FIG. 5 is a perspective view of another exemplary embodiment of a fastening device according to the invention, said embodiment being configured with two equalizing sleeves as equalizing elements, in like manner to the exemplary embodiment of FIG. 1, and fabricated with a separate rear engaging unit made of metal as an assembly component.

FIG. 5 is a perspective view of another exemplary embodiment of a fastening device 1 according to the invention, it being noted that like elements in the exemplary embodiment according to FIG. 1 and the exemplary embodiment according to FIG. 5 are provided with the same reference numerals and will not all be described more closely below. The exemplary embodiment according to FIG. 5 comprises a rear engaging ring 30 made of metal, whereas the fastening device 1 and the line holder 2 are otherwise made of plastic. The rear engaging ring 30 is inserted into the through opening 24 formed in the rear engaging unit 17 and comprises, as equalizing elements, bent rear engaging tongues 31, 32, 33 oriented similarly to rear engaging tongues 18, 19, 20.

Figure 6:
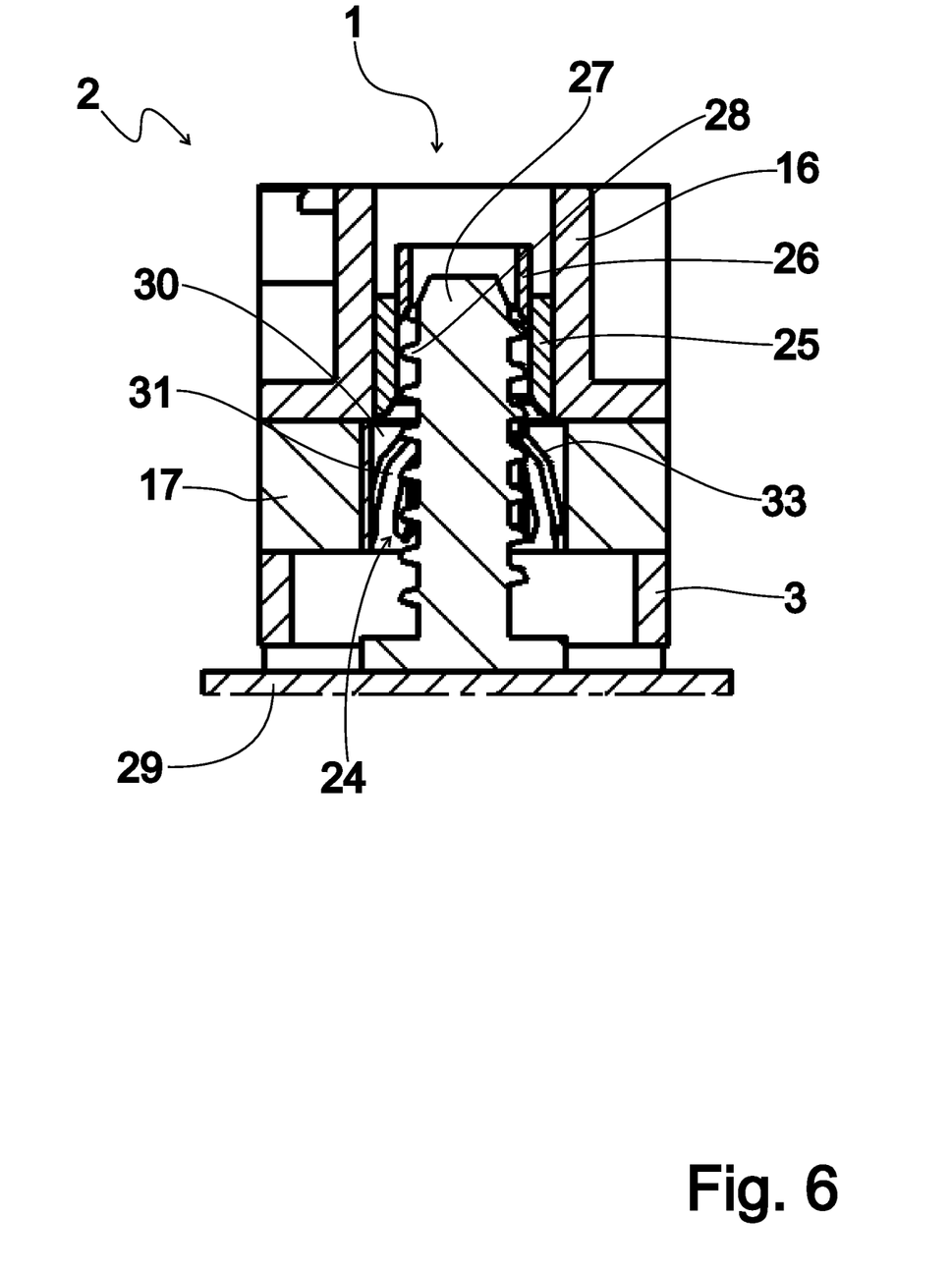
FIG. 6 is a sectional view of the exemplary embodiment according to FIG. 5 in engagement with a medium-diameter coarse thread bolt as fastening element.

FIG. 6 shows the exemplary embodiment of a fastening device 1 according to the invention as depicted in FIG. 5 in engagement with a medium-diameter coarse thread bolt 27 as an elongated fastening element configured with a thread structure 28 as detent structure, similar to the arrangement of FIG. 3. In similar fashion to the rear engagement of rear engaging tongues 18, 19, 20 in the exemplary embodiment of FIG. 1, in the exemplary embodiment of FIG. 5 the rear engaging tongues 31, 32, 33 engage behind the thread structure 28 of the coarse thread bolt 27 with a certain bias so as to, in concert with outer equalizing sleeve 25 in contact with the thread structure 28 of coarse thread bolt 27 in a retracted equalizing position, and inner equalizing sleeve 26 in an extended offset position, connect coarse thread bolt 27 to fastening device 1 substantially without play.

Figure 7:
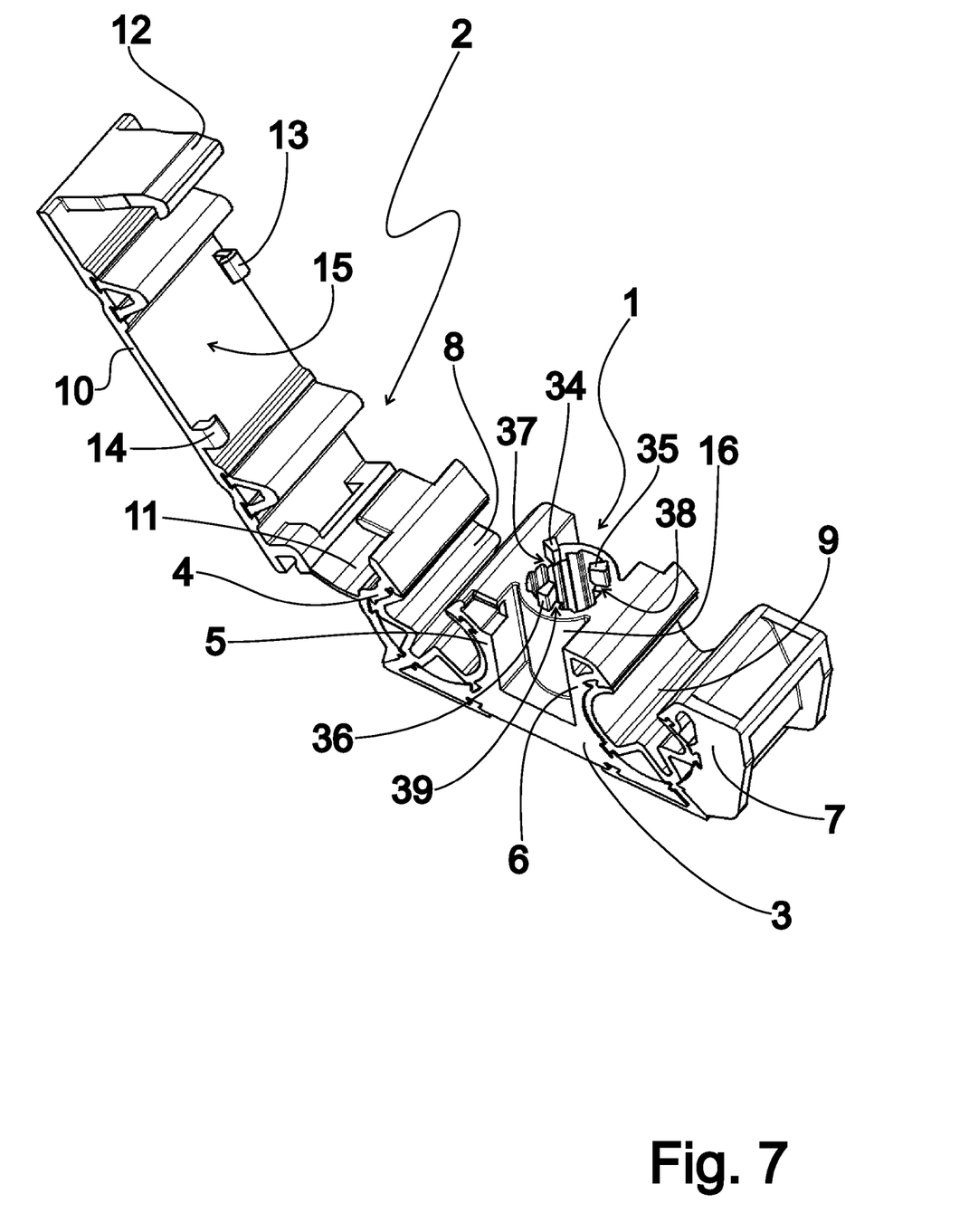
FIG. 7 is a perspective view of a third exemplary embodiment of a fastening device according to the invention, made entirely of plastic and configured with three sliding blocks as equalizing elements.

FIG. 7 is a perspective view of another exemplary embodiment of a fastening device 1 according to the invention, it being noted that like elements in the exemplary embodiment according to FIG. 1, the exemplary embodiment according to FIG. 5 and the exemplary embodiment according to FIG. 7 are provided with the same reference numerals and will not all be described more closely below. In the exemplary embodiment according to FIG. 7, present as equalizing elements are a number of—for example, three—sliding blocks 34, 35, 36, which are so mounted, in sliding-block guide rails 37, 38, 39 formed by lateral guide cheeks, as to be displaceable inside the receiving sleeve 16 in the longitudinal direction of said receiving sleeve 16. In the arrangement according to FIG. 7, the sliding blocks 34, 35, 36 are depicted raised above the end of the receiving sleeve 16 facing the cover part 10, as they would be on removal from the injection mold.

Figure 8:
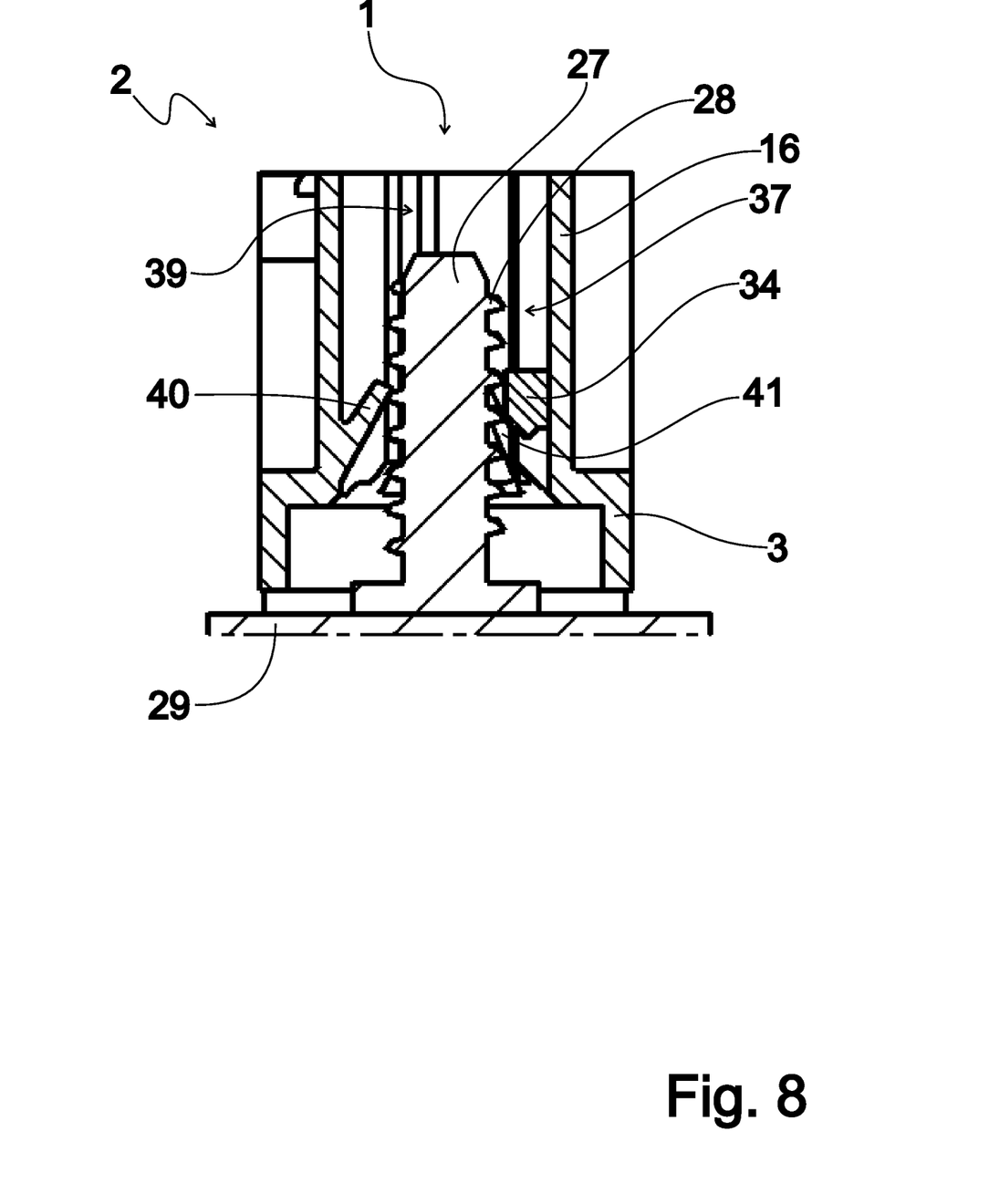
FIG. 8 is a sectional view of the exemplary embodiment according to FIG. 7 in engagement with a relatively small-diameter coarse thread bolt as fastening element.

FIG. 8 is a sectional view of the exemplary embodiment of a fastening device 1 cording to the invention as illustrated in FIG. 7, in engagement with a relatively small-diameter coarse thread bolt 27 as elongated fastening element having a thread structure 28 as detent structure. It can be seen from FIG. 8 that rear engaging tongues 40, 41 formed on the inner face of receiving sleeve 16 are in engagement, as in the previously described exemplary embodiments, with the thread structure 28 formed on the coarse thread bolt 27, whereas, due to the relatively small diameter of the coarse thread bolt 27, with this small useful cross section of the fastening device 1 the sliding blocks 34, 35, 36 are sunk into the region of the rear engaging tongues 40, 41 and in this retracted equalizing position are in contact with the thread structure 28 of the coarse thread bolt 27. As a result, the relatively small-diameter coarse thread bolt 27 is disposed in the fastening device 1 substantially without play.

Figure 9:
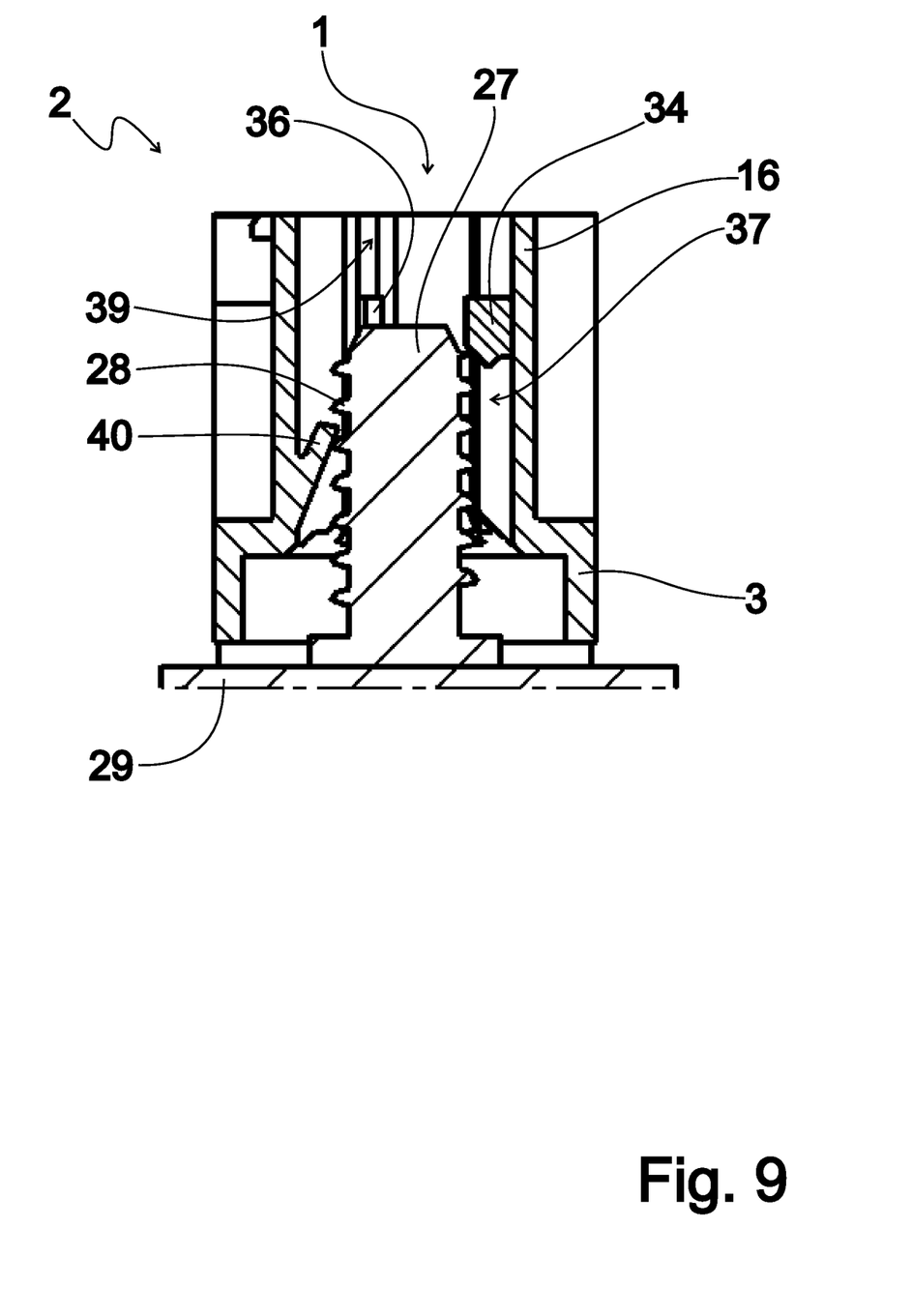
FIG. 9 is a sectional view of the exemplary embodiment according to FIG. 7 in engagement with a relatively large-diameter coarse thread bolt as fastening element.

FIG. 9 is a sectional view of the exemplary embodiment according to FIG. 7 with a relatively large-diameter coarse thread bolt 27 as elongated fastening element, which is so dimensioned that once the coarse thread bolt 27 has been inserted into the receiving sleeve 16, the sliding blocks 34, 35, 36 have been moved in the longitudinal direction away from the rear engaging tongues 40, 41 into an extended offset position to give the fastening device 1 a large useful cross section, and are, by a bevel, in stabilizing contact with the end region of the coarse thread bolt 27 remote from the support part 29. Together with the relatively high bias of the rear engaging tongues 40, 41 brought about by the relatively large diameter of the coarse thread bolt 27, the coarse thread bolt 27 is fixed substantially without play, despite some radial clearance with respect to receiving sleeve 16, by the contact with the sliding-shoe guide rails 37, 38, 39 even in the extended offset position of the sliding shoes 34, 35, 36 depicted in FIG. 9.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening device for fastening an attachment part to a support part, said fastening device comprising:
    at least one elongated fastening element having a detent structure and extending along a longitudinal direction;
    a base part including a receiving sleeve extending along said longitudinal direction;
    a cover part including a covering region covering said receiving sleeve;
    a plurality of resilient rear engaging tongues extending radially inwardly toward, and spaced peripherally about, said elongated fastening element;
    at least two equalizing elements separate from said cover part and from said base part and disposed within said receiving sleeve, said equalizing elements movable along said longitudinal direction from an equalizing position of retraction in which said equalizing elements are received within said receiving sleeve to reduce a cross section of said fastening device, to an extended offset position, said extended offset position axially displaced from said equalizing position along said longitudinal direction; and
    said equalizing elements disposed one inside the other in said equalizing position of retraction, and wherein each said equalizing element is a hollow, cylindrical equalizing sleeve.

2. The fastening device of claim 1, wherein said receiving sleeve includes a deep stop for each said equalizing element.

3. A fastening device for fastening an attachment part to a support part, said fastening device comprising:
    at least one elongated fastening element having a detent structure and extending alone a longitudinal direction;
    a base part including a receiving sleeve extending along said longitudinal direction;
    a plurality of resilient rear engaging tongues extending radially inwardly toward, and spaced peripherally about, said elongated fastening element; and
    at least two equalizing elements disposed within said receiving sleeve, said equalizing elements movable along said longitudinal direction from an equalizing position of retraction in which said equalizing elements are received within said receiving sleeve to reduce a cross section of said fastening device, to an extended offset position, said extended offset position axially displaced from said equalizing position along said longitudinal direction and, in said extended offset position, said equalizing elements are in abutment with said detent structure of said fastening element in said longitudinal direction;
    said equalizing elements disposed one inside the other in said equalizing position of retraction, and wherein each said equalizing element is a hollow, cylindrical equalizing sleeve.

4. The fastening device of claim 3, further comprising a cover part including a covering region covering said receiving sleeve.

5. The fastening device of claim 3, wherein each said equalizing element is a sliding block mounted in a guide rail formed on said receiving sleeve.

6. The fastening device of claim 5, including at least three said sliding blocks, said sliding blocks distributed symmetrically about a longitudinal axis of said receiving sleeve.

7. The fastening device of claim 3, wherein said receiving sleeve includes a deep stop for each said equalizing element.

8. A fastening device for fastening an attachment part to a support part, said fastening device comprising:
    at least one elongated fastening element having a detent structure and extending along a longitudinal direction;
    a base part including a receiving sleeve extending along said longitudinal direction;
    a plurality of resilient rear engaging tongues extending radially inwardly toward, and spaced peripherally about, said elongated fastening element; and
    at least two equalizing elements disposed within said receiving sleeve, said equalizing elements movable along said longitudinal direction from an equalizing position of retraction in which said equalizing elements are received within said receiving sleeve to reduce a cross section of said fastening device, to an extended offset position, said extended offset position axially displaced along said longitudinal direction from said equalizing position and, in each of said equalizing position and said extended offset position, said equalizing elements are disposed in their entirety in axially spaced relation from said rear engaging tongue along said longitudinal direction;

said equalizing elements disposed one inside the other in said equalizing position of retraction, and wherein each said equalizing element is a hollow, cylindrical equalizing sleeve.

9. The fastening device of claim 8, wherein said receiving sleeve includes a deep stop for each said equalizing element.

10. The fastening device of claim 8, further comprising a cover part including a covering region covering said receiving sleeve.

* * * * *